(12) United States Patent
Yumoto

(10) Patent No.: US 10,196,217 B2
(45) Date of Patent: Feb. 5, 2019

(54) TRANSPORT APPARATUS

(71) Applicant: NISSEI ASB MACHINE CO., LTD., Komoro-shi, Nagano (JP)

(72) Inventor: Haruhito Yumoto, Komoro (JP)

(73) Assignee: NESSEI ASB MACHINE CO., LTD., Komoro-shi, Nagano (JP)

( * ) Notice: Subject to any disclaimer, the term of this patent is extended or adjusted under 35 U.S.C. 154(b) by 0 days.

(21) Appl. No.: 16/031,008

(22) Filed: Jul. 10, 2018

(65) Prior Publication Data

US 2018/0312345 A1 Nov. 1, 2018

Related U.S. Application Data

(60) Division of application No. 15/663,054, filed on Jul. 28, 2017, now Pat. No. 10,035,664, which is a continuation of application No. PCT/JP2016/052712, filed on Jan. 29, 2016.

(30) Foreign Application Priority Data

Jan. 29, 2015 (JP) ................. 2015-016075

(51) Int. Cl.
*B29C 49/38* (2006.01)
*B29C 49/42* (2006.01)
(Continued)

(52) U.S. Cl.
CPC ............ *B65G 47/244* (2013.01); *B29C 49/38* (2013.01); *B29C 49/42* (2013.01); *B65G 47/846* (2013.01);
(Continued)

(58) Field of Classification Search
CPC ............... B65G 47/244; B65G 47/846; B65G 2201/0235; B65G 2201/0244;
(Continued)

(56) References Cited

U.S. PATENT DOCUMENTS 3,618,743 A * 11/1971 Benatar ................... B65B 35/58
198/384
4,428,474 A * 1/1984 Gau ........................ B65C 9/067
198/376
(Continued)

FOREIGN PATENT DOCUMENTS

EP 0488887 A1 6/1992
JP 2002-160288 6/2002
(Continued)

OTHER PUBLICATIONS

International Search Report issued from the Japanese Patent Office in International Application No. PCT/JP21016/052712, dated Apr. 19, 2016.

*Primary Examiner* — Mark A Deuble
(74) *Attorney, Agent, or Firm* — Finnegan, Henderson, Farabow, Garrett & Dunner, LLP

(57) ABSTRACT

A transport apparatus comprises: transport means 150 which is equipped with transport members 152 for holding preforms 200 to be rotatable in a horizontal direction and transports the transport members 152 along a transport line 151; and positioning means 300 for aligning the preforms 200 in a predetermined direction. The transport members 152 include regulation members for regulating the rotation of the preforms 200 aligned in the predetermined, direction by the positioning means 300.

10 Claims, 13 Drawing Sheets

(51) Int. Cl.
   *B29L 31/00* (2006.01)
   *B65G 47/84* (2006.01)
   *B65G 47/244* (2006.01)

(52) U.S. Cl.
   CPC . *B29L 2031/712* (2013.01); *B65G 2201/0235* (2013.01)

(58) Field of Classification Search
   CPC ..... B29C 49/38; B29C 49/42; B29C 49/4205; B29C 49/06; B29C 2049/4226; B29C 2049/4231; B29L 2031/712
   See application file for complete search history.

(56) References Cited

U.S. PATENT DOCUMENTS

| | | | |
|---|---|---|---|
| 4,497,409 A * | 2/1985 | Chong | B07C 5/36 198/394 |
| 5,058,724 A | 10/1991 | Hinton | |
| 6,308,816 B1 * | 10/2001 | Bankuty | B65C 9/065 198/377.1 |
| 8,342,316 B2 | 1/2013 | Zoppas et al. | |
| 9,580,252 B2 * | 2/2017 | Yokobayashi | B29C 49/4205 |
| 10,035,664 B2 * | 7/2018 | Yumoto | B29C 49/38 |
| 2009/0014281 A1 | 1/2009 | Eder et al. | |
| 2013/0284560 A1 | 10/2013 | Lukes et al. | |

FOREIGN PATENT DOCUMENTS

| | | |
|---|---|---|
| JP | 2006-062136 | 3/2006 |
| JP | 5484461 | 2/2014 |
| WO | WO 2010-007159 | 1/2010 |
| WO | WO 2013-027692 | 2/2013 |
| WO | WO 2014-203975 | 12/2014 |

* cited by examiner

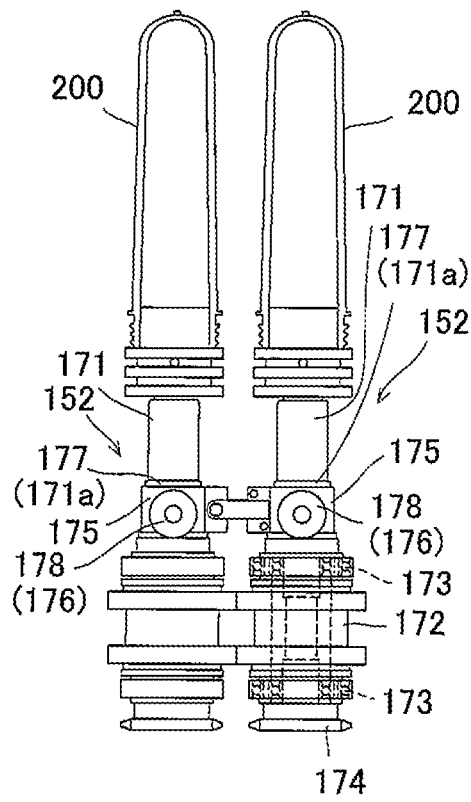
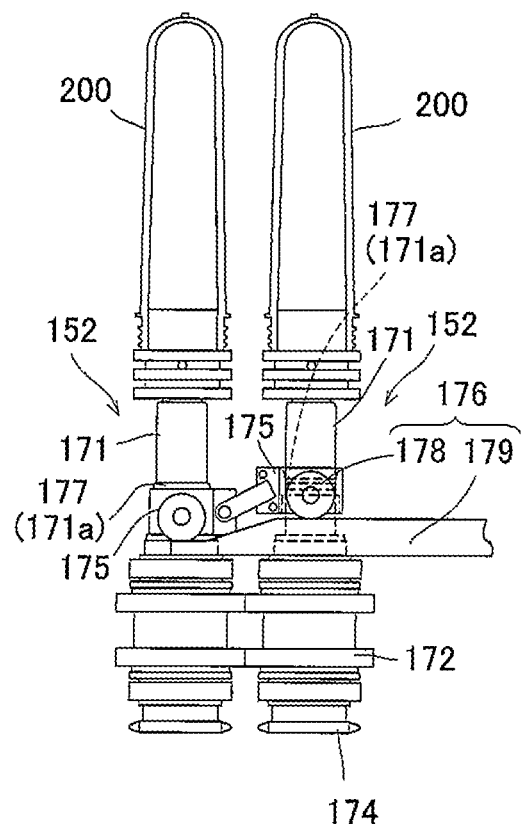
TRANSPORT DIRECTION

FIG.8(a) FIG.8(b)
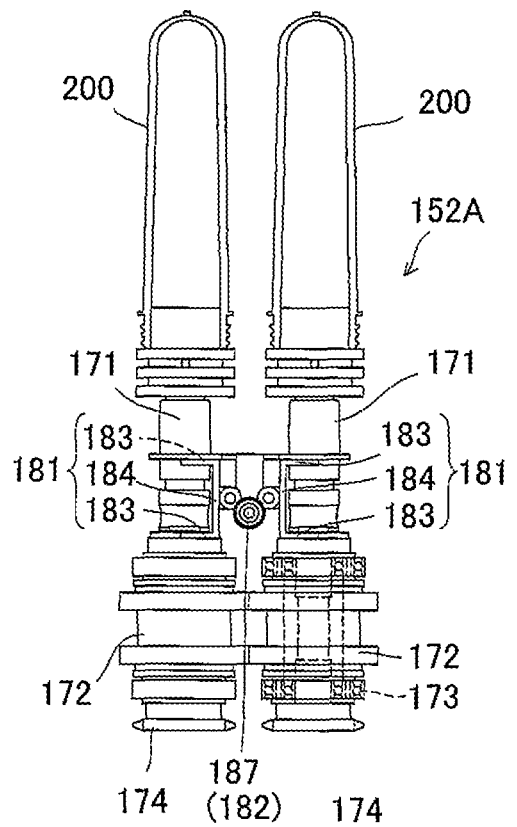
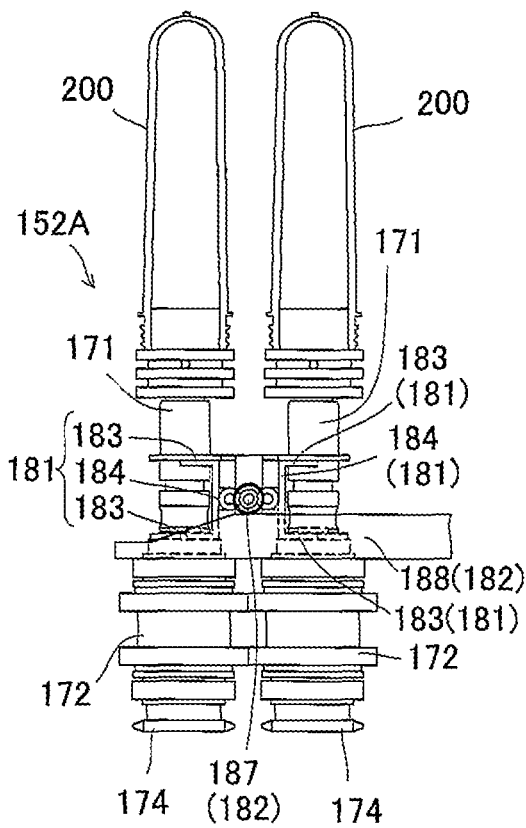
TRANSPORT DIRECTION          TRANSPORT DIRECTION
FIG.9
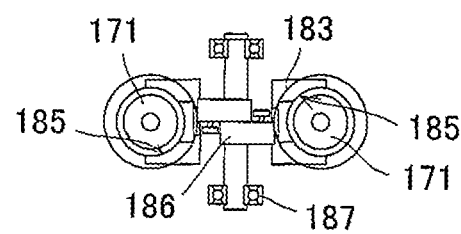

TRANSPORT APPARATUS

This application is a Divisional of U.S. application Ser. No. 15/663,054, filed Jul. 28, 2017, which is a Continuation of PCT International Application No. PCT/JP2016/052712, filed Jan. 29, 2016, which claims priority under 35 U.S.C. 119(a) to Patent Application No. 2015-016075, filed in Japan on Jan. 29, 2015, all of which are hereby expressly incorporated by reference into the present application.

TECHNICAL FIELD

This invention relates to a transport apparatus loaded on a blow molding machine or the like for producing a hollow container. Concretely, the invention relates to a transport apparatus having a positioning function for aligning preforms in the same direction during continuous transport.

BACKGROUND ART

An injection stretch blow molding apparatus called a 1.5-stage one, has been known as a blow molding apparatus in which a preform is disposed in a blow cavity mold, and the preform is blow-molded to form a hollow container (see, for example, Patent Document 1).

Such a blow molding apparatus is equipped with a transport apparatus for continuously transporting the preforms. The transport apparatus described in Patent Document 1, for example, has a plurality of sprockets, a plurality of transport members engageable with the plurality of sprockets for holding the preforms, and a guide rail for guiding the transport members along a transport direction.

In the above blow molding apparatus provided with such a transport apparatus, when a flat container of a nearly circular shape in a plan view or an in-mold labeled container, for example, is to be formed as a hollow container, it is necessary to align the respective preforms circumferentially in a constant direction and arrange them in a blow mold. Various transport apparatuses equipped with mechanisms for aligning the preforms, which are continuously transported, in a constant direction have been proposed (see, for example, Patent Document 2).

PRIOR ART DOCUMENTS

Patent Documents

Patent Document 1: WO2013/027692
Patent Document 2: Japanese Patent No. 5484461

SUMMARY OF THE INVENTION

Problems to be Solved by the Invention

By adjusting the directions of the preforms, for example, by the mechanism described in Patent Document 2, the preforms can be once aligned in the constant direction. That is, the positions of the preforms in the circumferential direction can be brought to a predetermined position.

However, the preform is generally held by the transport member so as to be rotatable (rotatable on its axis). Thus, during transport to the blow mold after positioning of the preform, there is a possibility that positional displacement of the preform will occur owing to vibrations, etc. by transport.

The present invention has been accomplished in the light of the foregoing circumstances. It is an object of the invention to provide a transport apparatus capable of aligning preforms in a constant direction during continuous transport, and transporting the preforms, while holding them in this direction.

Means for Solving the Problems

A first aspect of the present invention, intended to solve the above-mentioned problems, is a transport apparatus for transporting preforms to be blow-molded, the transport apparatus comprising: a transport means which is equipped with transport members for holding the preforms to be rotatable in a horizontal direction and transports the transport members along a transport line; and a positioning means for aligning the preforms in a predetermined direction, wherein the transport members include regulation members for regulating the rotation of the preforms aligned in the predetermined direction by the positioning means.

A second aspect of the present invention is the transport apparatus according to the first aspect, wherein the transport member comprises a support shaft for supporting the preform, and a housing for holding the support shaft to be rotatable, and the regulation member includes a slide member which is provided in an outer peripheral part of the support shaft so as to be slidable in an axial direction of the support shaft and is transported in a constant direction with respect to the transport line; a raising/lowering means for moving the slide member upward or downward when the preform is aligned in the direction by the positioning means; and a pinched member to be pinched between the support shaft and the slide member when the slide member is moved by the raising/lowering means.

A third aspect of the present invention is the transport apparatus according to the second aspect, wherein at least two of the slide members provided in the transport members which are adjacent to each other are coupled to be individually slidable.

A fourth aspect of the present invention is the transport apparatus according to the second or third aspect, wherein the pinched member is an O-ring which is mounted on the outer peripheral part of the support shaft, and seals a gap between the support shaft and the slide member when the slide member is moved by the raising/lowering means.

A fifth aspect of the present invention is the transport apparatus according to the first aspect, wherein the transport member comprises a support shaft for supporting the preform, and a housing for holding the support shaft to be rotatable, and the regulation member comprises: a longitudinal slide member which is provided on the support shaft so as to be slidable above a flange portion of the support shaft; an urging member for urging the longitudinal slide member toward the flange portion; and a transverse slide member which is provided to surround an outer periphery of the support shaft and, when slid on the flange portion in a diametrical direction of the support shaft, can engage a gap between the flange portion and the longitudinal slide member while pushing up the longitudinal slide member against an urging force of the urging member.

A sixth aspect of the present invention is a transport apparatus for transporting preforms to be blow-molded, the transport apparatus comprising: a transport means for transporting the preforms while allowing them to rotate on their axes in a horizontal direction; and engagement members for engaging the preforms, which are transported while being allowed to rotate on their axes, to bring directions of the preforms to a predetermined direction, wherein each of the engagement members has a support member which is supported to be swingable in a horizontal direction and has at one end a protrusion engaging a depression formed in the preform, and the support member is urged toward the preform and has the protrusion composed of a roller member provided to be rotatable in a horizontal direction.

Effects of the Invention

According to the transport apparatus of the present invention described above, after the directions of the preforms can be brought to the same direction during continuous transport, the preforms can be transported with this direction being kept.

BRIEF DESCRIPTION OF THE DRAWINGS

FIG. 7(a), 7(b) are side views illustrating the configuration and actions of the transport member according to Embodiment 1.

FIG. 8(a), 8(b) are side views showing a modification of the transport member according to Embodiment 1.

FIG. 9 is a plan view showing a modification of a regulation member according to Embodiment 1.

MODE FOR CARRYING OUT THE INVENTION

Embodiments of the present invention will now be described in detail by reference to the accompanying drawings.

Embodiment 1

First of all, the entire configuration of a molding apparatus having a transport apparatus according to the present invention will be described with reference to FIG. 1.

Figure 1:
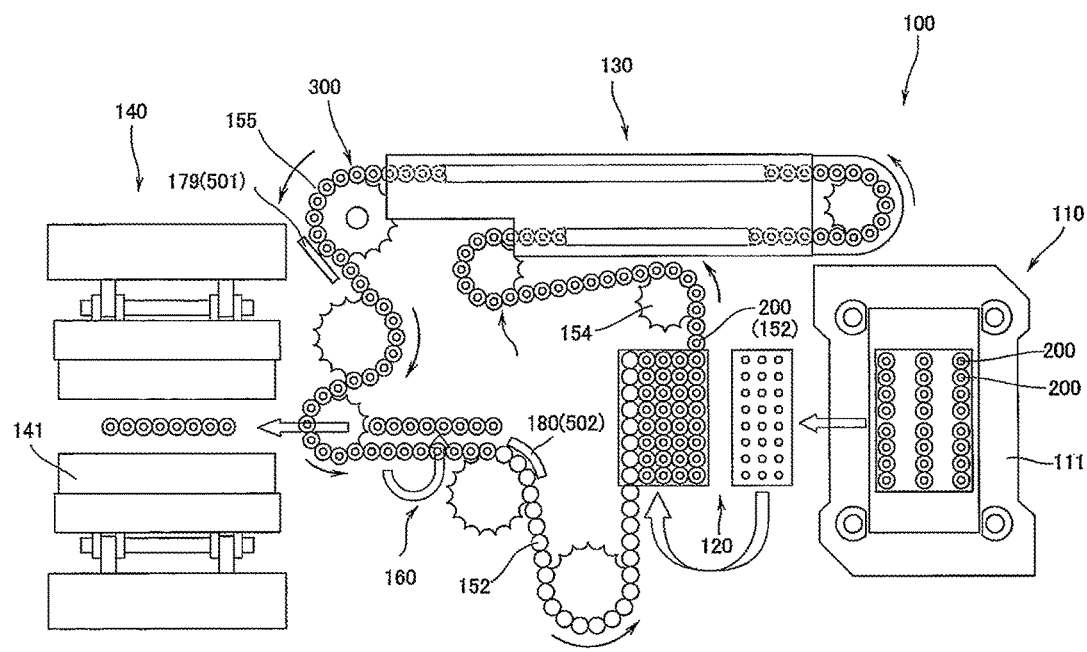
FIG. 1 is a view shoving the schematic configuration of a molding apparatus provided with a transport apparatus according to Embodiment 1.

As shown in FIG. 1, a molding apparatus 100 comprises an injection molding section 110 for injection molding a preform 200 to be formed into a hollow container, a cooling section 120 for cooling the preform 200 molded in the injection molding section 110, a heating section 130 for heating the preform 200, and a blow molding section 140 for blow molding the preform 200 disposed within a blow cavity mold.

The molding apparatus 100 is equipped with a transport apparatus including a transport unit (transport means) 150 for transporting the preform from the cooling section 120 to the heating section 130 and the blow molding section 140 along a transport line 151. The transport line 151, according to the present embodiment, is composed of a pair of transport rails (an outer transport rail 151a and an inner transport rail 151b). By the action of the transport unit 150, the preform 200 is transported from the cooling section 120 to the heating section 130, and the preform 200 heated by the heating section 130 is transported to the blow molding section 140.

The present invention is characterized by the configuration of the transport apparatus including the transport unit 150. The transport apparatus will be described in detail below. Since the configurations of the injection molding section 110, the cooling section 120, the heating section 130, and the blow molding section 140 are publicly known, they will be briefly described herein (if necessary, see, for example, WO2013/027692 by the present applicant).

The injection molding section 110 has a mold clamping mechanism 111, and clamps a core mold disposed above and a cavity mold disposed below by use of this mold clamping mechanism 111, although these molds are not shown. In the injection molding section 110, a resin material (raw material) is charged by an injection device into an injection space defined by the core mold and the cavity mold to injection mold the preform 200.

In the injection molding section 110, up to 24 (3 rows× 8/row) of the preforms 200, for example, can be molded at the same time. The preform 200, in the present embodiment, has a diametrical thickness different in the circumferential direction, and a depression (notch) 201 for directional alignment (see FIG. 2) is provided at a predetermined position in the outer peripheral surface of the preform 200.

The cooling section 120 forcibly cools the injection-molded preform 200. The preform 200 injection molded in the injection molding section 110 is transported along the transport line 151 by the transport unit 150, and supplied from the injection molding section 110 to the cooling section 120. When the preforms 200 are forcibly cooled by the cooling section 120 to a predetermined temperature, they are carried out of the cooling section 120, and continuously transported along the transport line 151.

The preform 200 is molded in an upright state in the injection molding section 110, with its neck portion facing upward, and transported in this state from the injection molding section 110 to the cooling section 120. The cooling section 120 has an inversion mechanism (not shown) for inverting the preform 200, which has been transported in the upright state, into an upside-down state, with the neck portion facing downward. The preform 200 is inverted in the upside-down state by the inversion mechanism during cooling in the cooling section 120, and is held by a transport jig (transport member) 152 provided in the transport unit 150.

The transport line 151 is configured such that a plurality of the transport jigs 152 are transported continuously and sequentially by the driving force of sprockets 154. The transport jigs 152 are arranged, for example, in a plurality of rows below the cooling section 120, and when holding the preforms 200, they are delivered onto the transport line 151. Then, the transport jigs 152 are transported along the transport line 151 while holding the preforms 200, and carried into the heating section 130.

In the heating section 130, the preform 200 cooled in the cooling section 120 is heated to a temperature appropriate for stretching while being moved along the transport line 151. With the present embodiment, the preform 200 is heated, while being allowed to rotate on its axis, within the heating section 130, whereby the entire preform 200 is heated uniformly.

A curved transport section 155 curved with a predetermined radius is provided downstream of the heating section 130 on the transport line 151. At a position, corresponding to the curved transport section 155, a positioning unit (positioning means) 300 constituting the transport apparatus is provided. The positioning unit 300 brings all of the directions (horizontal directions) of the preforms 200, which are being transported by the transport jigs 152, with respect to the transport line 151, to a predetermined direction. That is, the preforms 200 having passed through the curved transport section 155 are aligned by the positioning unit 300 into a state in which they are all headed in the predetermined direction. Then, the transport jigs 152 holding the preforms 200 are transported from the curved transport section 155 along the transport line 151, and carried into the blow molding section 140 via a transfer section 160.

The configuration of the positioning unit 300 is not particularly limited, but an example thereof will be described by reference to FIGS. 2 to 6.

Figure 2:
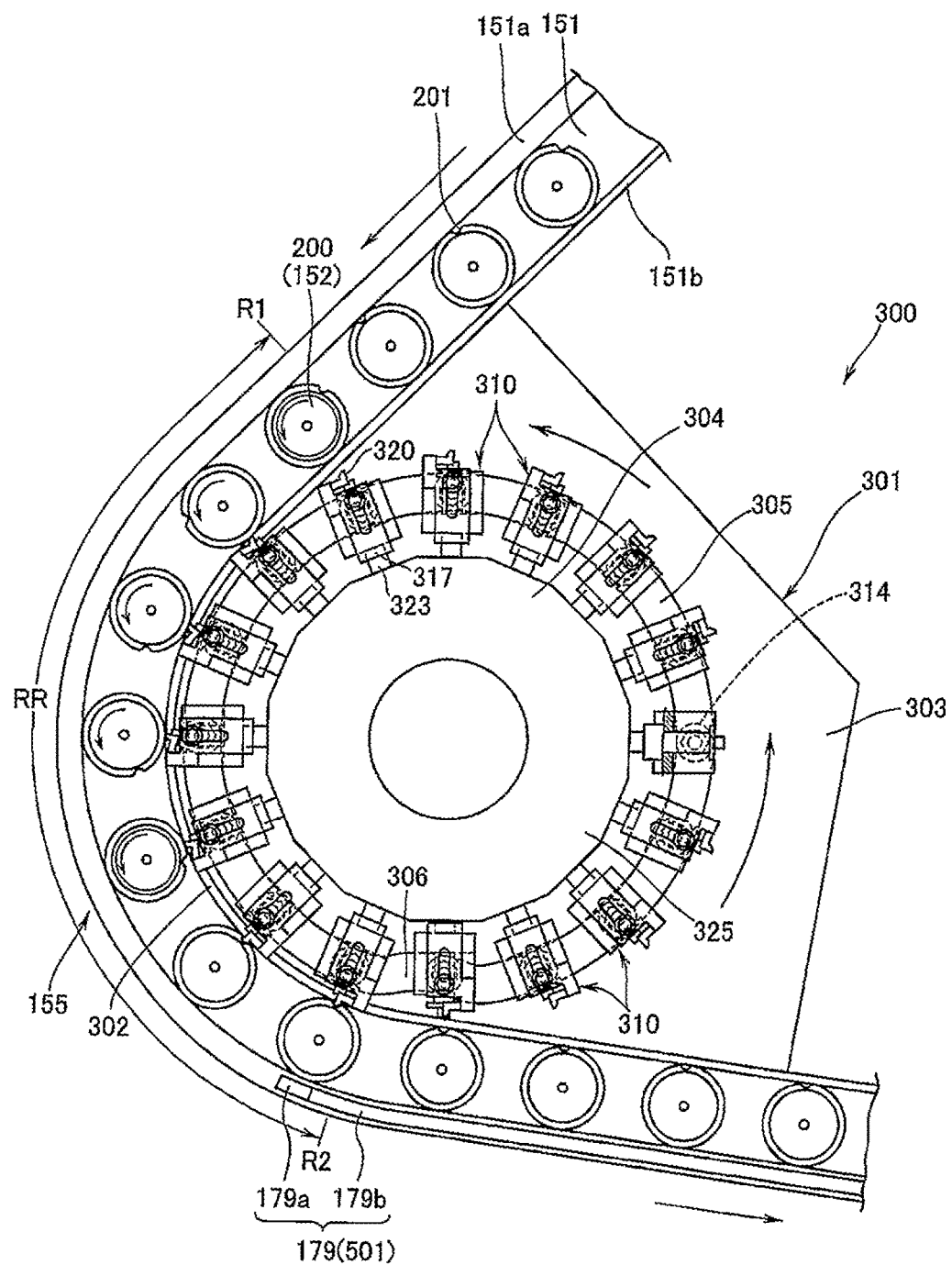
FIG. 2 is a plan view showing the transport apparatus according to Embodiment 1.
Figure 3:
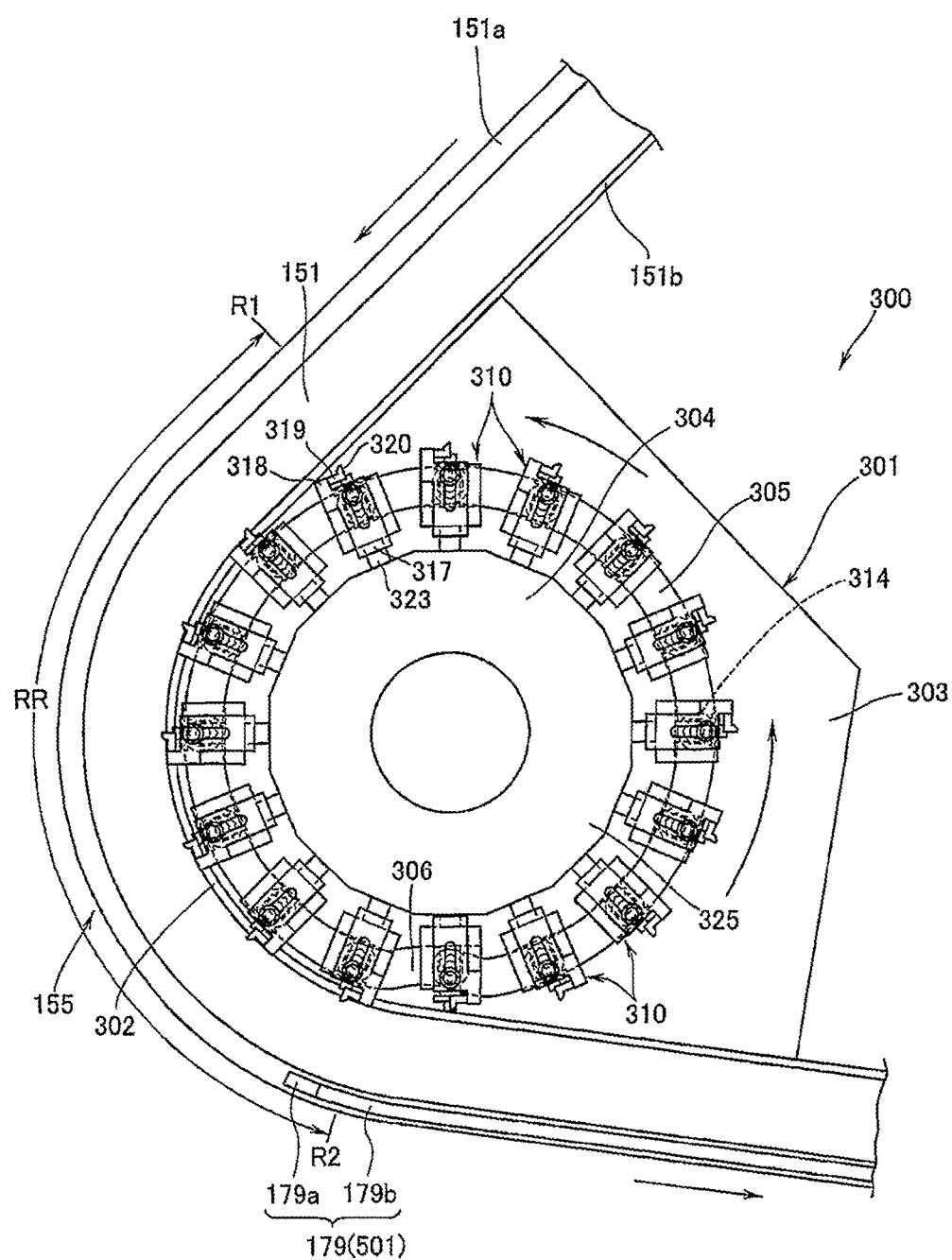
FIG. 3 is a plan view showing the transport apparatus according to Embodiment 1.

As shown in FIGS. 2 and 3, the positioning unit 300 provided in correspondence with the curved transport section 155 is equipped with an engagement device 301 for aligning all the preforms 200, which are being transported, into the predetermined direction. The engagement device 301 has a plurality of engagement members 310 each of which engages the depression 201 of the preform 200 transported along the transport line 151 and aligns the preform 200 in the predetermined direction.

The engagement device 301 includes a pedestal portion 303 having a curved part 302 curved in correspondence with a curved part of the curved transport section 155. In the pedestal portion 303, a columnar part 304 is provided. The columnar part 304 is configured to be rotatable on its axis in a horizontal direction, with its center as an axial center. The direction of the rotation of the columnar part 304 on its axis is set to be identical with the direction of transport. That is, in FIGS. 2 and 3, the direction of the rotation of the columnar part 304 on its axis is set to be counterclockwise. The engagement members 310 are fixed to the columnar part 304 in such a manner as to be spaced from each other by a predetermined distance. Since the columnar part 304 is polygonal, nearly circular in rough terms, when viewed from top, the engagement members 310 can be said to be provided at predetermined intervals in the circumferential direction.

In a top view, an annular groove part 305 of a nearly toric shape is formed in the pedestal portion 303. The annular groove part has a cam structure. In detail, a rolling member 314 of the engagement member 310 (to be described later) is inserted into the annular groove part 305. The annular groove part 305 has a retreat part 306 which, at a predetermined position, is concave toward the columnar part 304, namely, concave inwardly.

Figure 4:
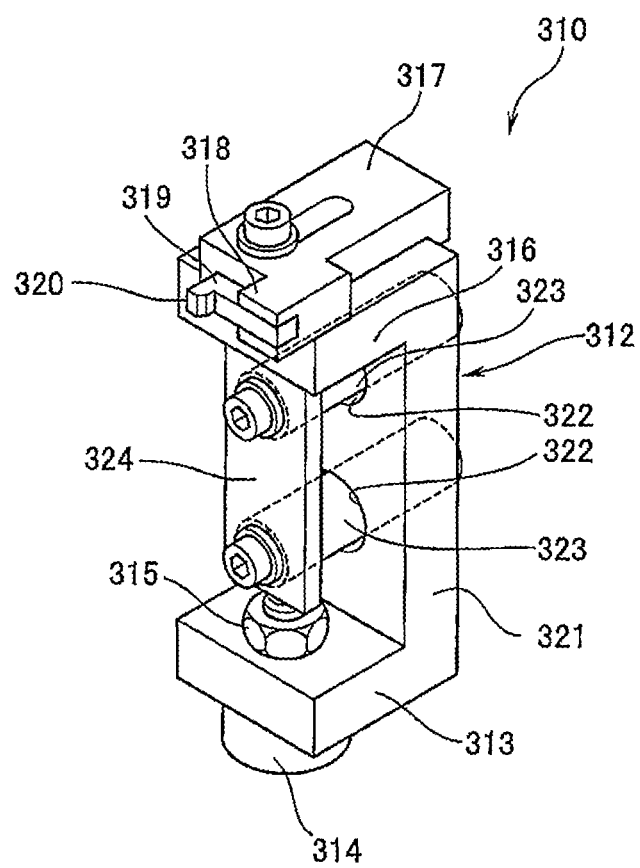
FIG. 4 is a perspective view of an engagement member constituting the transport apparatus according to Embodiment 1.

As shown in FIG. 4, each engagement member 310 has a first support portion 312. The first support portion 312 is a U-shaped member in a side view. At a bottom surface part 313 constituting the bottom surface of the first support portion 312, the rolling member 314, such as a cam follower, is provided to extend vertically downwardly. The rolling member 314 is fastened to the bottom surface pare 313 by a fastening member 315. The rolling member 314 is inserted into the annular groove part 305 (see FIG. 2) having the cam structure, as mentioned above.

A second support portion 317 is provided above an upper surface part 316 constituting the upper surface or the first support portion 312. A support member 319 is provided in a nearly L-shaped leading end part 318 of the second support portion 317 formed to face the transport line 151 (see FIGS. 2 and 3). The support member 319 is supported horizontally swingably in the nearly L-shaped leading end part 318 of the second support portion 317. That is, the support member 319 is supported in a so-called cantilever state. Moreover, the support member 319 is urged so that its leading end side (one end side) is located outwardly of the second support portion 317 (on the side opposite to the second support portion 317). That is, the support member 313 is urged toward the preform 200 transported on the transport line 151.

The leading end side (one end side) of the support member 319 is a protrusion 320 protruding toward the transport line 151 (see FIGS. 2 and 3). The protrusion 320 is of a shape corresponding to the depression 201 (see FIG. 2) of the preform 200 as will be described in detail later. In order that the protrusion 320 always juts out to a region opposing the transport line 151, the support member 319 is urged toward the side opposite to the second support portion 317 (see FIG. 3).

Two through-holes 322 are formed in a rear surface part 321 of the first support portion 312 constituting the area between the bottom surface part 313 and the upper surface part 316, and cylindrical parts 323 are provided to pass through the through-holes 322. A proximal end side (at least one end side) of each cylindrical part 323 is fixed to the columnar part 304 (see FIGS. 2 and 3). A plate-shaped part 324 is fixed to a leading end side of each cylindrical part 323 so as to span the respective cylindrical parts 323. The predetermined distance between the engagement members 310 provided on the columnar part 304 coincides with the distance between the transport jigs 152, namely, the distance between the preforms 200.

Next, the operating state of the positioning unit 300 will be described.

Each engagement member 310 has the rolling member 314 inserted into the annular groove part 305. When the columnar part 304 begins to rotate on its axis (the direction of this rotation on its axis is indicated by arrows in FIGS. 2 and 3), therefore, the engagement member 310 moves along the annular groove part 305 in accordance with the rotation of the columnar part 304 on its axis. That is, the annular groove part 305 functions as a guide groove for the engagement member 310. Here, the annular groove part 305 has the retreat part 306 which, at the predetermined position, is concave toward the columnar part 304 (i.e., concave inwardly). Hence, when the engagement member 310 moves to the retreat part 306, it retreats inwardly along the shape of the retreat part 306. After passing through the retreat part 306, the engagement member 310 moves again along the annular groove part 305.

Next, the motions of the preform 200 transported in the direction of transport (indicated by the arrows in FIGS. 2 and 3) near the curved transport section 155 will be described.

In the curved part 302, the distance between the preforms 200 and the distance between the engagement members 310 are in agreement. Also, the transport speed of the preform 200 and the moving speed of the engagement member 310 associated with the rotation of the columnar part 304 are substantially in agreement. In the curved part 302, therefore, the engagement member 310 and the preform 200 always move while opposing each other. In other words, the engagement member 310 and the preform 200 are moved at a timing at which the engagement member 310 and the preform 200 oppose each other.

Figure 5:
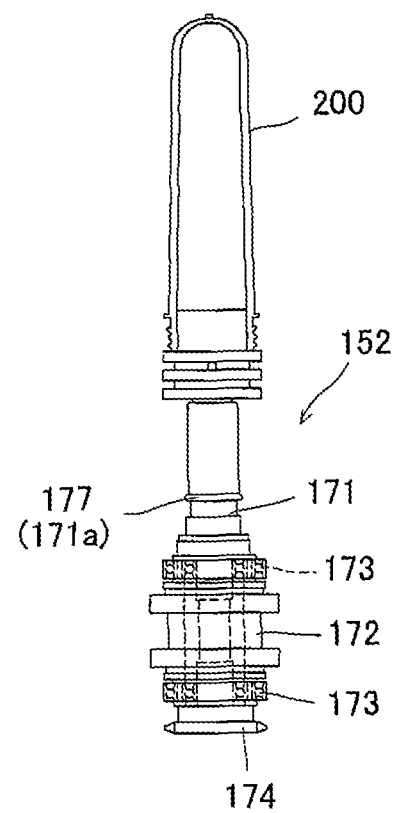
FIG. 5 is a side view showing the schematic configuration of a transport member according to Embodiment 1.

The transport jig 152 is configured to allow the preform, which the transport jig 152 holds, to be rotatable (rotatable on its axis) in the horizontal direction, even near the curved transport section 155. Concretely, the transport jig 152 has a support shaft 171 for supporting the preform 200 at its leading end (upper end), and a housing 172 for holding the support shaft 171 to be rotatable (rotatable on its axis), as shown in FIG. 5. In the present embodiment, the support shaft 171 is rotatably held by the housing 172 via a bearing member 173 such as a ball bearing. A sprocket 174 is provided at the lower end of the support shaft 171, and the sprocket 174 is fitted onto a roller chain (not shown) provided on the transport line 151. Because of this configuration, the transport jig 152 allows the support shaft 171, which holds the preform 200, to be rotatable (rotatable on its axis) in RR (rotation region, precisely, region of rotation on its axis, a region where the support shaft 171 or preform 200 rotates on its axis; to be described later; see FIG. 2). The rotating direction of this rotation on its axis is not particularly limited, but may be clockwise or counterclockwise.

The position at which the rotation of the support shaft 171 (preform 200) on its axis in the transport direction of the transport line 151 is started is designated as a rotation start position R1, and the position at which the rotation of the support shaft 171 (preform 200) on its axis ends is designated as a rotation end position R2. In this case, the region ranging from the rotation start position R1 to the rotation end position R2 is the rotation region RR (see FIG. 2). The rotation region RR, in the present embodiment, ends at a site upstream, in the transport direction, of the position opposing the retreat part 306.

If, for example, the sprocket 174 provided on the support shaft 171 is fitted to the roller chain provided on the transport line 151, whereby the support shaft 171 is rotated on its axis, as mentioned above, it follows that the roller chain is provided all over the rotation region RR. In the rotation region RR, if the preform 200 does not engage the engagement member 310, the preform 200 can make at least one rotation in the range from the rotation start position R1 to the rotation end position R2.

As shown in FIG. 2, when the preforms 200 are transported on the side upstream of the curved transport section 155, the preforms 200 are in a misaligned state in which the directions of the preforms 200 are not constant, but the depressions 201 are headed in different directions. In this misaligned state, the preforms 200 flow into the rotation region RR. Within the rotation region RR, the preforms 200 are transported while rotating on their axes. During transport along the transport line 151, with the preform 200 rotating on its axis, the protrusion 320 of the engagement member 310 is fitted into the depression 201 provided in the preform 200. Upon fitting of the protrusion 320 into the depression 201, the preform 200 stops rotating as a result of this engagement, whereafter only the support shaft 171 of the transport jig 152 rotates on its axis.

At the same time that the preform 200 flows out of the rotation region RR, the engagement member 310 retreats into the retreat part 306. Thus, the support member 319 (protrusion 320) is released from the preform 200, and the preform 200 is transported in this state. That is, the preforms 200 located downstream, in the transport direction, of the position, corresponding to the retreat part 306 are all transported in an aligned state in which the depressions 201 are aligned in the same direction.

Figure 6:
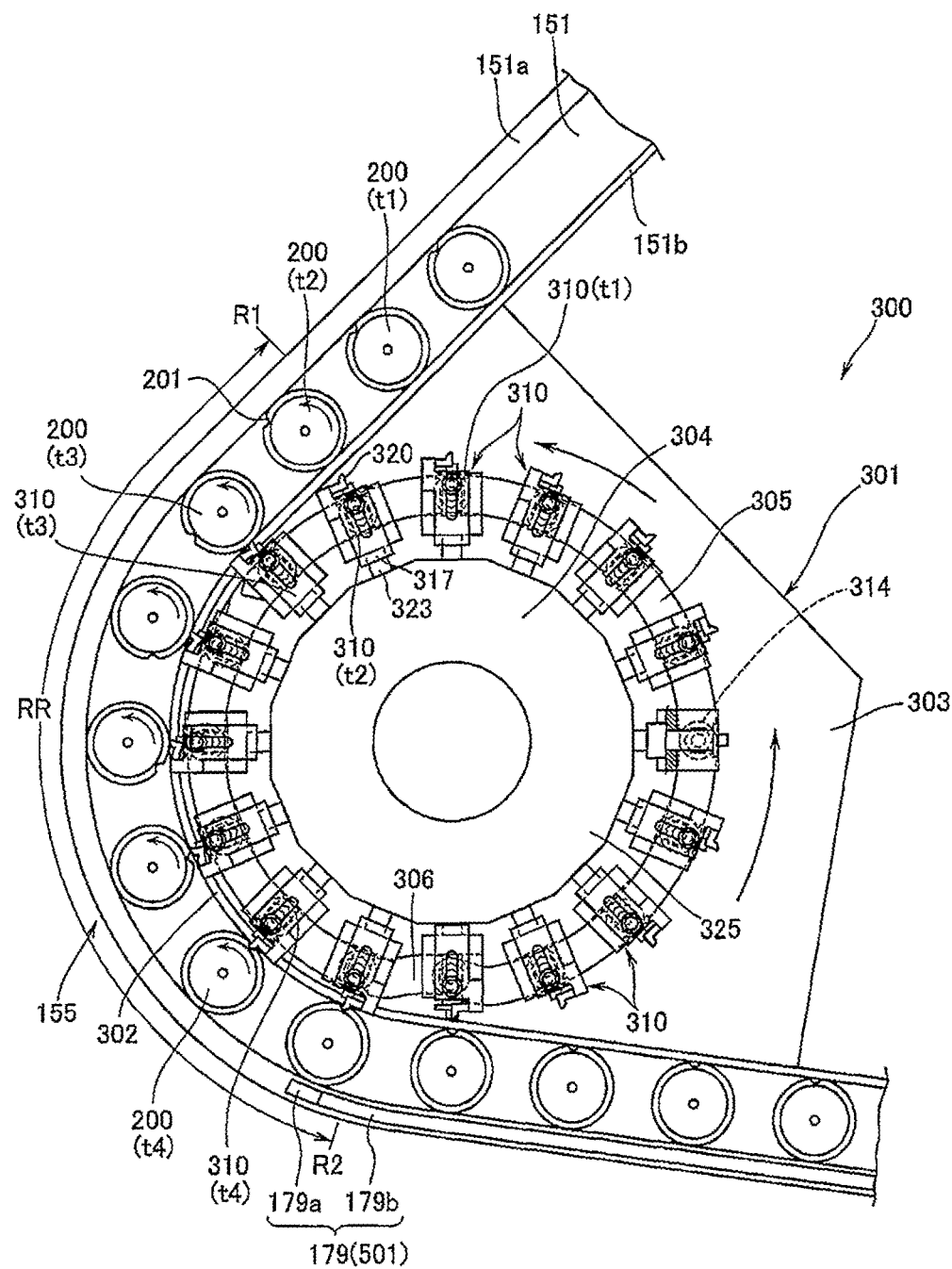
FIG. 6 is a plan view illustrating the actions of the transport apparatus according to Embodiment 1.

In this connection, a further concrete explanation will be offered using FIG. 6. FIG. 6 shows the transport stats of the single preform 200 in the curved transport section 155, and illustrates the transport position of the preform 200 over time and the single engagement member 310 engaging the preform 200 while opposing it. That is. FIG. 6 describes a plurality of the preforms 200 and a plurality of the engagement members 310, but they are all the same preform 200 and the same engagement member 310, and represent their positions at the respective times.

As stated above, when the preform 200 is transported in the curved transport section 155, the engagement member 310 moves along the annular groove part 305 in synchronization with the transport of the preform 200. At a time t1, the preform 200 is transported to a site directly before the rotation start position R1 of the curved transport section 155. The preform 200 (t1) at the time t1 has the depression 201 facing outward. At this point in time, the engagement member 310 (t1) does not oppose the preform 200 (t1) yet.

When the preform 200 arrives at the rotation start position R1, where the support shaft 171 of the transport jig 152 begins to rotate on its axis, the preform 200 also begins to rotate on its axis. The direction of the rotation on its axis is the direction indicated by arrows. In the rotation region RR, the preform 200 is transported while rotating on its axis. The preform 200 (t2) at a time t2 in the vicinity of the rotation, start position R1 does not oppose the engagement member 310 (t2) at this point in time.

Then, the preform 200 is further transported and, at a time t3, the preform 200 (t3) opposes the engagement member 310 (t3). At this point in time, the protrusion 320 of the engagement member 310 does not engage the depression 201 of the preform 200 (t3). Thus, the support member 310 having the protrusion 320 is pressed by the preform 200 (t3) and pushed in toward the second support portion 317.

Then, the preform 200 keeps transported and continues rotating on its axis while pressing the protrusion 320 and, at a time t4 when the depression 201 of the preform 200 (t4) faces inward, the protrusion 320 of the engagement member 310 (t4) is engaged with the depression 201.

Since the preform 200 rotates on its axis in the rotation region RR, as described above, the depression 201 of the preform 200 engages the support member 319 of the engagement member 310, without fail, in the rotation region RR, no matter which direction the preform 200 being transported to the curved transport section 155 is headed in. When the preform 200 is transported out of the rotation region RR, the distance between the preform 200 and the engagement member 310 gradually increases, releasing the engagement between the support member 319 (protrusion 320) provided in the engagement member 310 and the depression 201 of the preform 200. The rotation of the support shaft 171 (preform 200) on its axis is terminated after the preform 200 passes through the rotation region RR. Afterwards, therefore, each preform 200 is transported toward the blow molding section 140, with its direction being held.

In the present invention, moreover, the transport jig 152 has a regulation member for regulating the rotation of each preform 200 on its axis, the preform 200 having its direction aligned by the positioning unit 300. Thus, the transport jig 152 can transport the respective preforms 200 toward the blow molding section 140 while holding them in the predetermined direction more reliably.

The regulation member is provided in the transport jig 152 movably, and its movement is performed by the moving mechanism portion installed laterally of the transport line 151 (on the transport rails). The moving mechanism portion is composed of a movement regulation member (looking member) 501 for fixing the support shaft 171, which has been held by the housing 172, in a state in which the support shaft 171 cannot rotate on its axis, and a regulation release member (unlocking member) 502 for returning the support shaft 171 again into a state in which the support shaft 171 can rotate on its axis.

Hereinafter, the configurations of the regulation member and the moving mechanism portion will be described in detail.

The transport jig 152 is equipped with a slide member 175, a raising/lowering member (raising/lowering means) 176, and a pinched member 177, as the regulation member, as shown in FIGS. 7(a), 7(b). The slide member 175 is provided in an outer peripheral part of the support shaft 171 so as to be slidable in a vertical direction (axial direction of the suppers shaft 171). The slide member 175 has a nearly rectangular outer shape in a plan view, and is transported in a predetermined direction with respect to the transport line 151. That is, the slide member 175 is formed to be transported along the transport line 151 without rotating (rotating on its axis).

The raising/lowering member 176 moves the slide member 175 upward at a timing at which the direction of the preform 200 is aligned by the positioning unit 300, namely, at a timing at which the preform 200 passes the rotation end position R2. In the present embodiment, the raising/lowering member 176 is composed of a cam follower 178 provided in the slide member 175. The cam follower 178 is provided to be rotatable in a direction along the transport line 151. On at least one of the transport rails constituting the transport line 151, for example, on the outer transport rail 151a, there is provided a cam member 179 (movement regulation member 501) on whose upper surface the cam follower 178 rolls. The cam member 179, in the present embodiment, is provided such that an upward inclination part 179a is located upstream of the rotation end position R2 (see FIG. 2). The cam member 179 may be provided near the rotation end position R2 of the transport line 151 so that the rotation of the support shaft 171 on its axis is regulated at a timing when the direction of the preform 200 is aligned. For example, the upward inclination part 179a may be disposed downstream of the rotation end position R2.

When the perform 200 passes the rotation end position R2, the cam follower 178 constituting the regulation member rolls on the upward inclination part 179a of the cam member 179 (movement regulation member 501), whereby the slide member 175 ascends to a predetermined height. Then, while the cam follower 178 is rolling on a flat part 179b of the cam member 179, the slide member 175 is maintained at that height.

The pinched member 177 is a member which is provided in the outer peripheral part of the support shaft 171, and is pinched between the support shaft 171 and the slide member 175 when the slide member 175 is moved to the predetermined height by the raising/lowering member 176, as stated above. In the present embodiment, for example, the pinched member 177 is an O-ring consisting of an elastic member. A groove part 171a continuously extending in the circumferential direction is provided on the outer peripheral surface of the support shaft 171, and the pinched member 177 is mounted on the groove part 171a (see FIG. 5).

When the transport jig 152 is passing through the rotation, region. RR, the slide member 175 is located below the pinched member 177, as shown in FIG. 7(a), and the pinched member 177 does not contact the slide member 175. Thus, the support shaft 171 holding the preform 200 rotates on its axis as mentioned above, and each preform 200 is aligned in the predetermined direction.

After the transport jig 152 passes through the rotation region RR, namely, moves past the rotation end position R2, the cam follower 178 rolls on the upward inclination part 179a of the cam member 179, whereupon the slide member 175 ascends to the predetermined height as shown in FIG. 7(b). As a result, the gap between the support shaft 171 and the slide member 175 is sealed with the pinched member 177 which is the O-ring.

When the gap between the support shaft 171 and the slide member 175 is sealed with the pinched member 177, that is, when the pinched member 177 is pinched between the support shaft 171 and the slide member 175, the resulting frictional force regulates the rotation of the support shaft 171 (rotation on its axis). Thus, the respective preforms 200 aligned in the predetermined direction in the rotation region RR can be transported while being held in that direction even after their passage through the rotation region RR.

In the present embodiment, moreover, the adjacent two slide members 175 are coupled together to be individually slidable (ascendable and descendable). Thus, each slide member 175 can be kept from rotating (rotating on its axis) in the horizontal direction, with the result that each preform 200 can be transported while being held in the desired direction more reliably. Needless to say, the same effects can be obtained, even if three or more of the slide members 175 are coupled together.

In the transfer section 160 to be supplied with the preforms 200 aligned in the predetermined direction, of the preforms 200 held in an upside-down state, a predetermined number (e.g., 8) of them at a time are inverted by a transport arm (not shown), and withdrawn in an upright state (see FIG. 1). In the blow molding section 140, the predetermined number of the preforms 200 received from the transfer section 160 are transported to a blow cavity mold 141 composed of a pair of split molds, and the preforms 200 are blow-molded in the blow cavity mold 141.

As described above, the preforms 200 are transported in the direction-aligned state, so that the preforms 200 are aligned in the same direction even when carried into the blow molding section 140. Hence, even if the shapes of the preforms 200 are not uniform in the circumferential direction of the preform 200 (e.g., in case the sectional shape of the preform 200 is an elliptical shape, or in case the thickness of the preform 200 is not uniform), desired blow molding can be performed in the blow molding section 140.

The transport jig 152 to be returned from the transfer section 160 to the initial position (cooling section 120) needs to be restored to a state, in which the transport jig 152 can rotate on its axis, before being carried into the heating section 130. To perform this restoration reliably, a cam member 180 (regulation release member 502) for lowering the slide member 175 is installed on at least one of the transport rails, for example, the inner transport rail 151b, constituting the transport line 151 between the transfer section 160 and the heating section 130. The cam member 180 (regulation release member 502) is preferably provided between the transfer section 160 and the cooling section 120. In the present embodiment, the cam member 180 is disposed in proximity to the transfer section 160.

In the present embodiment, moreover, the cam member 179 (movement regulation member 501) is formed on the outer transport rail 151a, while the cam member 180 (regulation release member 502) is formed on the inner transport rail 151b, but this arrangement of them is not particularly limiting. For example, the cam member 179 (movement regulation member 501) may be provided on the inner transport rail 151b, whereas the cam member 180 (regulation release member 502) may be provided on the outer transport rail 151a. Alternatively, the cam member 179 (movement regulation member 501) and the cam member 180 (regulation release member 502) may be provided on one of the outer transport rail 151a and the inner transport rail 151b. Furthermore, the cam member 179 (movement regulation member 501) and the cam member 180 (regulation release member 502) may be provided on both sides of the transport line 151, namely, on both of the outer transport rail 151a and the inner transport rail 151b.

Besides, the above embodiment illustrates the transport jig 152 as having the slide member 175, raising/lowering member (raising/lowering means) 176 and pinched member 177 as the regulation member. However, the configuration of the regulation member is not particularly limited, but may be one capable of regulating the rotation of the preform 200 on its axis.

FIGS. 8(a), 8(b) are views illustrating a modification of the transport jig including the regulation member. In the example shown in FIGS. 8(a), 8(b), the transport jig 152 is equipped with a contact member 181 as a regulation member, and a moving member (movement means) 182 for moving the contact member 181. The contact member 181 has a pair of contact portions 183 arranged with a predetermined spacing in the vertical direction, and a coupling portion 184 for coupling the pair of contact portions 183 together, and has a longitudinal section formed in a nearly U-shape. In other words, the respective contact portions 183 are provided to protrude from both vertical ends of the coupling portion 184 toward the support shaft 171. In the contact portion 183, a semicircular recess 185 with a diameter comparable to that of the support shaft 171 is formed in a top view, as shown in FIG. 9.

The moving member 182 is composed of a cam follower 187 provided in an extension 186 extended from the coupling portion 184 of the contact member 181. The cam follower 187 is provided to be rotatable in a direction along the transport line 151. In such a configuration as well, a cam member 188 (movement regulation member 501) on whose upper surface the cam follower 187 rolls is provided on at least one of the transport rails, for example, the outer transport rail 151a, constituting the transport line 151. The cam member 188 is provided near the rotation end position R2 of the transport line 151 (see FIG. 2, etc.) as stated above.

The contact member 181 as described above is moved by the moving member 182, and the contact portions 183 contact the support shaft 171, whereby the rotation of the support shaft 171 on its axis is regulated.

In detail, when the transport jig 152A is passing through the rotation region RR, the contact member 181 is disposed at a position slightly spaced from the support shaft 171, as shown in FIG. 8(a), and the contact portions 183 do not contact the support shaft 171. Thus, the support shaft 171 holding the preform 200 as above rotates on its axis, and the respective preforms 200 are aligned in the predetermined direction. After the transport jig 152 passes through the rotation region RR, that is, passes the rotation end position R2, the cam follower 187 as the regulation member rolls on an upward inclination part 188a of the cam member 188 (movement regulation member 501), so that the extension 186 ascends. In accordance with this ascent, the contact member 181 moves toward the support shaft 171, and the contact portions 183 contact the support shaft 171, as shown in FIG. 8(b). As a result, the rotation of the support shaft 171 (rotation on its axis) is regulated. Thus, the preforms 200 aligned in the predetermined direction in the rotation region RR can be transported, while being held in this direction, even after passage through the rotation region RR.

With such a configuration as well, in order to restore the support shaft 171 to a state in which the support shaft 171 can rotate on its axis, the cam member 180 (regulation release member 502) for lowering the cam follower 187 (contact member 181) is provided on at least one of the transport rails, for example, the inner transport rail 151b, constituting the transport line 151 between the transfer section 160 and the heating section 130 (see FIG. 2). Even in this case, it goes without saying that the cam member 179 (movement regulation member 501) and the cam member 180 (regulation release member 502) may be provided on only one side of the transport line 151, namely, on only one of the outer transport rail 151a and the inner transport rail 151b. If necessary, the cam member 179 (movement regulation member 501) and the cam member 180 (regulation release member 502) may be provided on both sides of the transport line 151, namely, on both of the outer transport rail 151a and the inner transport rail 151b.

Embodiment 2

Figure 10:
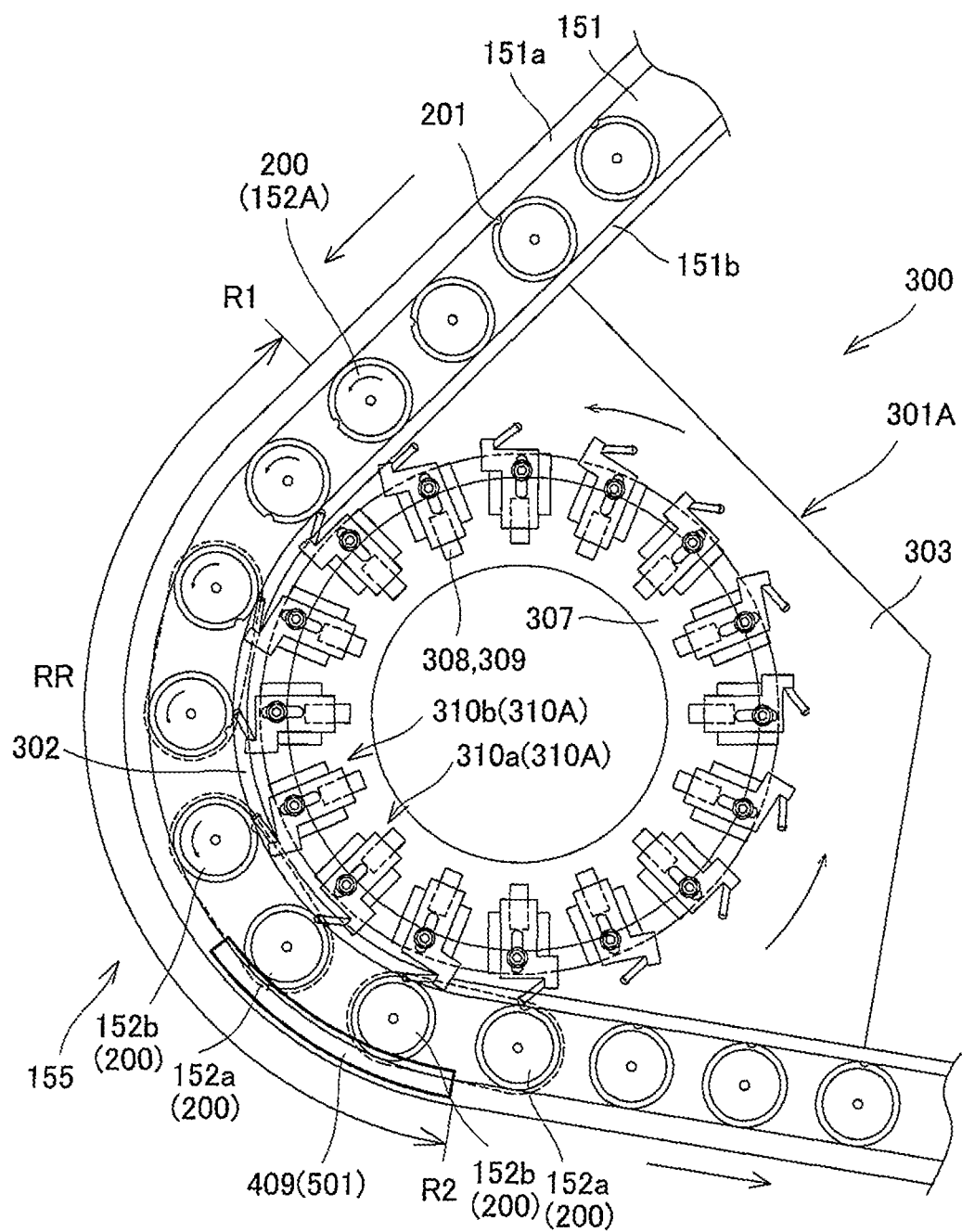
FIG. 10 is a plan view showing a transport apparatus according to Embodiment 2.
Figure 11:
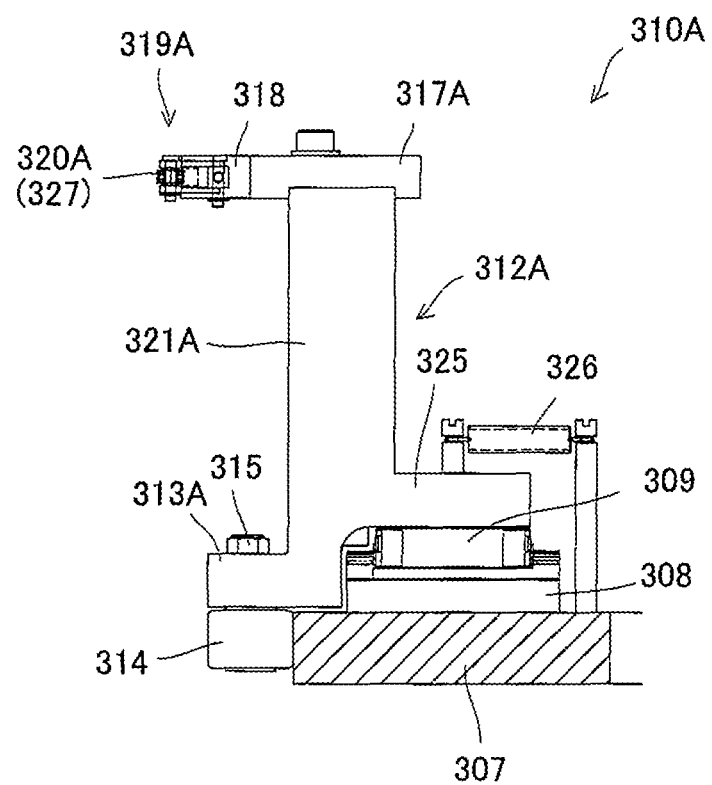
FIG. 11 is a side view of an engagement member constituting the transport apparatus according to Embodiment 2.
Figure 12:
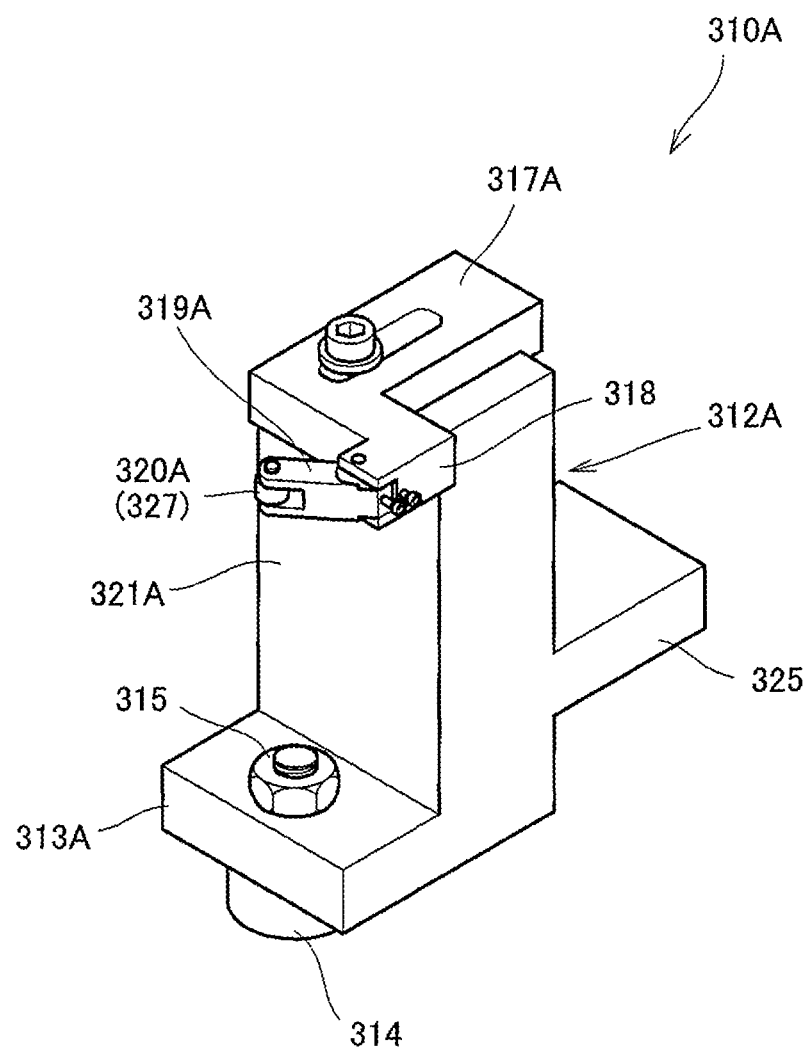
FIG. 12 is a perspective view of the engagement member constituting the transport apparatus according to Embodiment 2.
Figure 13A:
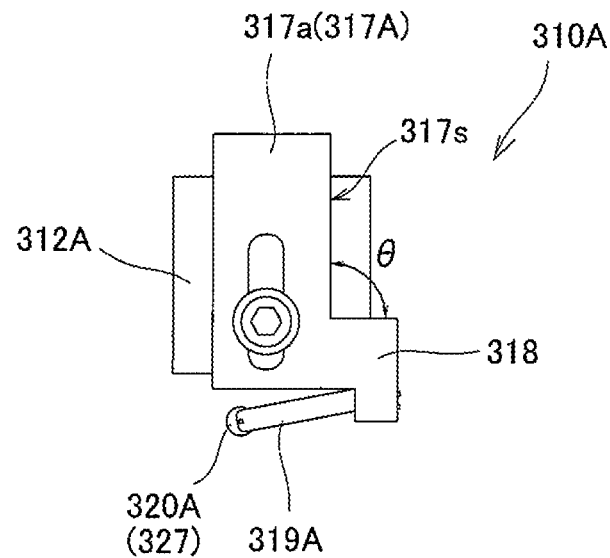
FIG. 13(a), 13(b) are top views of the engagement member according to Embodiment 2.
Figure 13B:
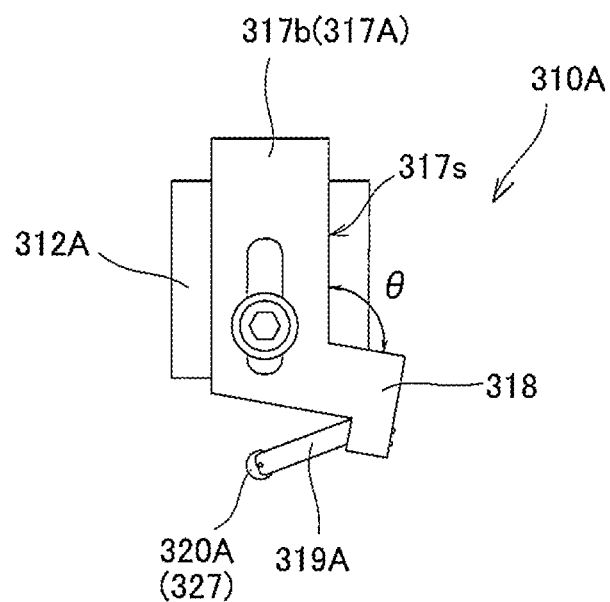
Figure 14A:
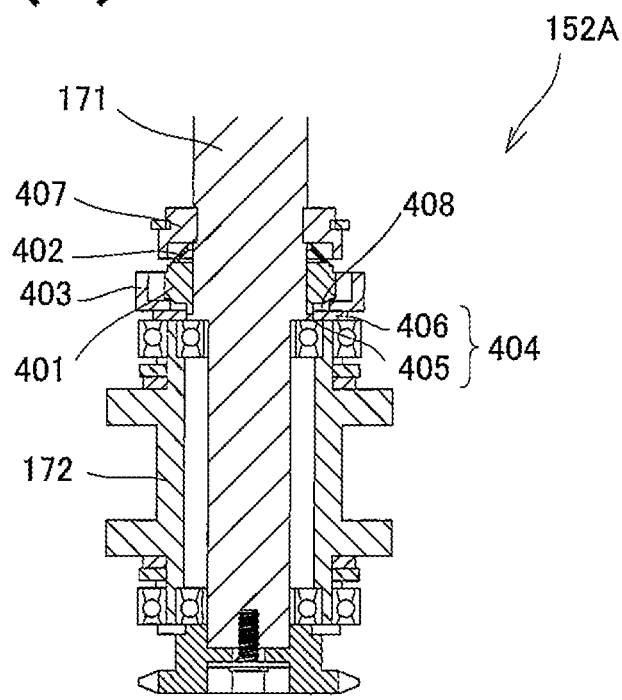
FIGS. 14(a), 14(b) are side views illustrating the configuration and actions of a transport member according to Embodiment 2.
Figure 14B:
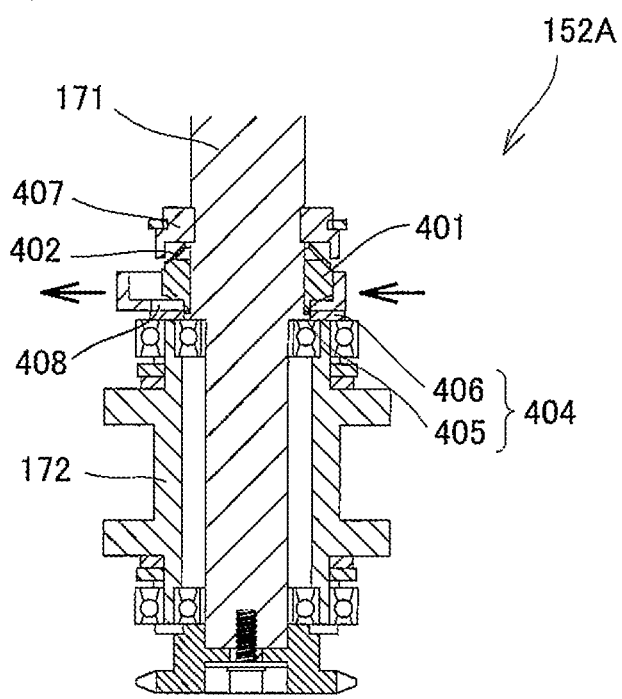

FIG. 10 is a plan view showing a transport apparatus according to Embodiment 2. FIG. 11 is a side view of an engagement member constituting the transport apparatus according to Embodiment 2. FIG. 12 is a perspective view of the engagement member constituting the transport apparatus according to Embodiment 2. FIGS. 13(a), 13(b) are top views of the engagement member according to Embodiment 2. FIGS. 14(a), 14(b) are side views illustrating the configuration and actions of a transport member according to Embodiment 2.

The present embodiment is different from Embodiment 1 in the configurations of the engagement device and the transport member, and is the same as Embodiment 1 in terms of the other configurations. In the drawings, the same members are assigned the same numerals, and duplicate explanations will be omitted.

As shown in FIGS. 10 to 12, an engagement device 301A according to the present embodiment is equipped with a plurality of engagement members 310A, as in Embodiment 1. These engagement members 310A are loaded on a ring-shaped annular pedestal portion 307, which the engagement device 301A has, unlike the configuration of Embodiment 1. On she annular pedestal portion 307, guide rail members 308 are provided along the diametrical direction of the annular pedestal portion 307 at positions corresponding to the engagement members 310A. That is, a plurality of the guide rail members 308 are provided in the annular pedestal portion 307 radially at predetermined intervals. The guide rail members 308 are provided with slide members 309 capable of sliding on the guide rail members 308. The engagement members 310A are fixed on the slide members 309, respectively. That is, the engagement members 310A are loaded on the annular pedestal portion 307 so as to be slidable along the diametrical direction of the annular pedestal portion 307.

A first support portion 312A of the engagement member 310A according to the present embodiment has a bottom surface part 313A under which a rolling member 314 is provided to extend vertically downwardly, and a rear surface part 321A extended upwardly from the bottom surface part 313A, as in Embodiment 1 (see FIG. 12). The engagement member 310A further has a back protrusion 325 provided to protrude from the rear surface part 321A toward the center of the annular pedestal portion 307, and the back protrusion 325 is fixed on the slide member 309 (see FIG. 11).

The engagement member 310A is always urged toward the center of the annular pedestal portion 307 by a spring member 326 composed of a coil spring or the like. That is, the spring member 326 has one end side fixed to the back protrusion 325, and the other end side fixed to the annular pedestal portion 307 (see FIG. 11).

A second support portion 317A is provided on the rear surface part 321A of the engagement member 310A. As in Embodiment 1, a support member 319A is provided horizontally swingably at a nearly L-shaped leading end part 318 of the second support portion 317A facing the transport line 151. The support member 319A is urged so that its leading end side (one end side) is located outwardly of the second support portion 317A (on the side opposite to the second support portion 317A). In the present embodiment, a roller member 327 composed of, for example, a ball bearing is provided horizontally rotatably on the one end side (leading end side) of the support member 319A. The roller member 327 forms a protrusion 320A.

The protrusion 320A composed of the roller member 327 is fitted into the depression 201 of the preform 200 in the rotation region RR, whereby each preform 200 is aligned in the predetermined direction.

With the configuration of the present embodiment, the protrusion 320A is composed of the roller member 327, so that a pressing force or a frictional force when the protrusion 320A contacts the preform 200 in the rotation region RR is reduced. Thus, the inhibition of the rotation of the preform 200 (rotation on its axis) in a misaligned state in the rotation region RR can be suppressed, and it becomes possible to align each preform 200 in the predetermined direction more reliably.

With the transport apparatus according to the present embodiment, two adjacent transport jigs 152A (152a, 152b) are transported as a set on the transport line 151. For this purpose, each of these two transport jigs 152A (152a, 152b) has the rotation of its housing 172 per se regulated. Consequently, the positional displacement of the preform 200 associated with the rotation of the housing 172 can be prevented.

Some clearance is present between the transport line 151 and the transport jig 152A. If the two transport jigs 152a and 152b are transported as a set, therefore, the succeeding transport jig 152b passes on a transport path slightly outward of that for the preceding transport jig 152a in the curved transport section 155 including the rotation region RR. In consideration of such a deviation between the transport paths of the two transport jigs 152a and 152b, the second support portions 317A (317a, 317b) corresponding to the transport jigs 152a, 152b are in different shapes.

Concretely, the second support portion 317a corresponding to the preceding transport jig 152a is formed such that the angle θ of the nearly L-shaped leading end part 318, where the support member 319A is supported, with respect to a side surface 317s of the second support portion 317a is a nearly right angle, as shown in FIG. 13(a). On the other hand, the second support portion 317b corresponding to the succeeding transport jig 152b is formed such that the angle θ of its nearly L-shaped leading end part 318 with respect to the side surface 317s of the second support portion 317a is an obtuse angle, as shown in FIG. 13(b). That is, the leading end part 318 of the second support portion 317b corresponding to the succeeding transport jig 152b is more protrusive toward the transport line 151 than the leading end part 318 of the second support portion 317a corresponding to the preceding transport jig 152a. In other words, the protrusion 320A provided in the second support portion 317b corresponding to the succeeding transport jig 152b can protrude toward the transport line 151 more than the protrusion 320A provided in the second support portion 317a corresponding to the preceding transport jig 152a.

Because of the above features, the preforms 200 can be aligned in the predetermined direction, even if a deviation occurs between the transport paths of the two transport jigs 152A (152a, 152b).

If, for example, the clearance between the transport line 151 and the transport jig 152A is relatively small and requires no consideration for the deviation in the transport path, the second support portions 317 corresponding to she two transport jigs 152 (152a, 152b) may be of the same shape, even when the two transport jigs 152a and 152b are transported as a set.

The transport jig 152A according to the present embodiment is different from the transport jig of Embodiment 1 in the configuration of the regulation member. Concretely, as shown in FIGS. 14(a), 14(b), the transport jig 152A is equipped with a longitudinal slide member 401, an urging member 402, and a transverse slide member 403, as the regulation member. The longitudinal slide member 401 is provided on an outer peripheral part of the support shaft 171 vertically (longitudinally) slidably. In the support shaft 171, a flange portion 404 jutting out in the diametrical direction of the support shaft 171 is formed below the longitudinal slide member 401, and a lower end part of the longitudinal slide member 401 is held in contact with the flange portion 404.

In the present embodiment, the flange portion 404 is composed of an integral flange part 405 formed integrally with the support shaft 171, and a fixing plate 406 fixed to the outside of the integral flange part 405. The integral flange part 405 functions as a bearer of the bearing member 173 for holding the housing 172 to be rotatable. Needless to say, however, the integral flange part 405 need not have such a function.

The urging member 402 is, for example, composed of a coned disk spring, and urges the longitudinal slide member 401 toward the flange portion 404. In the present embodiment, a holding member 407 for holding the upper end side of the urging member 402 is provided above the urging member 402. The holding member 407 is fixed to the support shaft 171. Since the urging member 402 is pinched between the holding member 407 and the longitudinal slide member 401, the longitudinal slide member 401 is urged downward (toward the flange portion 404) by the urging member 402.

When the lower end of the longitudinal slide member 401 is in contact with the flange portion 404 (integral flange pare (405), an ample gap is ensured between the longitudinal slide member 401 and the holding member 407. In this state, therefore, the longitudinal slide member 401 is not urged by the urging member 402.

The transverse slide member 403 is provided to surround the outer peripheral part of the support shaft 171 and to be slidable on the flange portion 404 (fixing plate 406) in the diametrical direction of the support shaft 171. In detail, the transverse slide member 403 has a penetrating part 408 in the center, and is slidable within the penetrating part 408 in the diametrical direction of the support shaft 171.

With the above-mentioned configuration of the present embodiment, when the transverse slide member 403 is positioned concentrically with the support shaft 171 (FIG. 14(*a*)), the longitudinal slide member 401 is located within the penetrating part 408 of the transverse slide member 403, and its lower end contacts the flange portion 404. Thus, the longitudinal slide member 401 is not urged by the urging member 402. Hence, the rotation of the support shaft 171 (rotation on its axis) is not regulated, and the preform 200 is aligned in the predetermined direction.

When the transverse slide member 403 is pressed from its outside and slid in the diametrical direction of the support shaft 171, the transverse slide member 403 enters between the flange portion 404 and the longitudinal slide member 401 while pushing up the longitudinal slide member 401 (FIG. 14(*b*)). As the longitudinal slide member 401 is pushed up, the gap between the longitudinal slide member 401 and the holding member 407 is narrowed, and the urging member 402 is pinched therebetween. That is, the transverse slide member 403 is engaged into the gap between the flange portion 404 and the longitudinal slide member 401 while pushing up the longitudinal slide member 401 against the urging force of the urging member 402. Thus, when the transverse slide member 403 is at a position which is not concentric with the support shaft 171, the longitudinal slide member 401 is urged downward by the urging member 402. Furthermore, the transverse slide member 403 is urged downward by the longitudinal slide member 401, and pressed against the flange portion 404 (fixing plate 406) provided in the support shaft 171. As a result, the rotation of the support shaft 171 (rotation on its axis) is regulated.

The movement of the transverse slide member 403 is performed by the moving mechanism portion installed laterally of the transport line 151 (on the transport rails), as in Embodiment 1. The moving mechanism portion is composed of the movement regulation member 501 for fixing the support shaft 171, which has been held by the housing 172, in a state in which the support shaft 171 cannot rotate on its axis, and the regulation release member 502 for returning the support shaft 171 again into a state in which the support shaft 171 can rotate on its axis (see FIG. 1, FIG. 2).

That is, the transverse slide member 403 contacts a first convex member 409 (movement regulation member 501), which is provided on the outer transport rail 151*a* constituting the transport line 151 and which protrudes into a region opposing the transport line (between the outer transport rail 151*a* and the inner transport rail 151*b*) 151, thereby sliding from the concentric position to the nonconcentric position (see FIG. 10). The first convex member 409 is provided in the curved transport section 155 of the transport line 151, and is arranged close to the rotation end position R2 so that the transverse slide member 403 moves to the nonconcentric position at a timing when the direction of the preform 200 is aligned by the positioning unit 300, namely, at a timing when the preform 200 passes the rotation end position R2. In the present embodiment, the first convex member 409 is provided upstream of the rotation end position R2. The arrangement of the first convex member 403 is not particularly limited, and the first convex member 409 may be extended from sites upstream of and downstream of the rotation end position R2 on the transport line 151, or may be provided downstream of the rotation end position R2. Any arrangement of the first convex member 409 is acceptable, as long as it can regulate the rotation of the support shaft 171 on its axis at a timing when the direction of the preform 200 is aligned.

With the foregoing configuration, the rotation of the support shaft 171 (rotation on its axis) is regulated, at a stage at which the preform 200 is aligned in the predetermined direction in the rotation region RR. Thus, each preform 200 aligned in the predetermined direction in the rotation region RR can be transported, while being held in that direction, even after passage through the rotation region RR.

As in Embodiment 1, the transport jig 152 has to be returned from the transfer section 160 to the initial position (cooling section 120) needs to be restored to a state, in which the transport jig 152 can rotate on its axis, before being carried into the heating section 130. A second convex member as the regulation release member 502 is provided on a side part of the transport line 151 (the side part on the side opposite to the first convex member 409) between the transfer section 160 and the heating section 130, on the inner transport rail 151*b* according to the present embodiment, although this is not shown here. The second convex member as the regulation release member 502 is configured such that when it is contacted with the outer peripheral part of the transverse slide member 403, the transverse slide member 403 slides from the nonconcentric position so the concentric position.

The first convex member 409 as the movement regulation member 501 is provided, in the present embodiment, on the outer transport rail 151*a* constituting the transport line 151. However, it may be provided on the inner transport rail 151*b* constituting the transport line 151. In this case, the second convex member as the regulation release member 502 is provided on the outer transport rail 151*a* constituting the transport line 151.

The present invention has been described above in connection with its embodiments, but it is to be understood that the invention is in no way limited to these embodiments. The present invention can foe changed or modified, as appropriate, without departing from its spirit, and scope.

In the above-described embodiments, for example, the protrusion of the engagement member is fitted into the depression (notch) provided in the preform, whereby each preform is aligned in the predetermined direction. However, the structure for direction alignment of the preform is not limited to the above structure. For example, a convexity may be provided in the preform, and this convexity may be fitted into a depression (notch) provided in the engagement member.

EXPLANATIONS OF LETTERS OR NUMERALS

100 molding apparatus, 110 injection molding section, 111 mold clamping mechanism, 120 cooling section, 130 heating section, 140 blow molding section, 141 blow cavity mold, 150 transport unit, 151 transport line, 151*a* outer transport rail, 151*b* inner transport rail, 152 transport jig (transport member), 154 sprocket, 155 curved transport section, 160 transfer section, 171 support shaft, 171*a* groove part, 172 housing, 173 bearing member, 174 sprocket, 175 slide member (regulation member), 176 raising/lowering member, 177 pinched member, 178 cam follower (regulation member), 179 cam member (movement regulation member), 179*a* inclination part, 179*b* flat part, 180 cam member (regulation release member), 181 contact member (regulation member), 182 moving member, 183 contact portion, 184 coupling portion, 185 recess, 186 extension, 187 cam follower (movement regulation member), 188 cam member (regulation member), 188*a* inclination part, 200 preform, 201 depression, 300 positioning unit, 301 engagement device, 302 curved part, 303 pedestal portion, 304 columnar part, 305 annular groove part, 306 retreat part, 307 annular pedestal portion, 308 guide rail member, 309 slide member, 310 engagement member, 312 first support portion, 313 bottom surface part, 314 rolling member, 315 fastening member, 316 upper surface part, 317 second support portion, 318 leading end part, 319 support member, 320 protrusion, 321 rear surface part, 322 through-hole, 323 cylindrical part, 324 plate-shaped part, 325 back protrusion, 326 spring member, 327 roller member, 401 longitudinal slide member (regulation member), 402 urging member (regulation member), 403 transverse slide member (regulation member), 404 flange portion, 405 integral flange part, 406 fixing plate, 407 holding member, 408 penetrating part, 409 first convex member (movement regulation member), 501 movement regulation member (locking member), 502 regulation release member (unlocking member).

The invention claimed is:

1. A transport apparatus for transporting a preform for blow molding, comprising:
   a transporter having transport jigs, each of the transport jigs for holding one preform of a plurality of preforms in an inverted state with a neck of each of the preforms facing downward, and which transporter continuously transports the preforms at a transport speed along a transport line in a horizontal direction along with the transport jigs while rotating the transport jigs and allowing each of the preforms to rotate about its own vertical axis with rotation of the transport jigs; and
   an engaging device comprising an engager provided so as to be movable along the transport line in conformity with the transport speed of each of the preforms by the transporter, and the engager provided so as to engage a convexity or a concavity provided in an outer periphery of each of the preforms with the preforms moving to stop the rotation of each of the preforms about the axis thereof, thereby setting an orientation of each of the preforms to a predetermined orientations,
   wherein the engaging device has a plurality of engagers,
   each of the engagers has a support member which is provided horizontally swingably and has at a leading end part a protrusion protruding toward the transport line, and
   the protrusion is formed by a roller member which is provided horizontally rotatably on the support member.

2. The transport apparatus according to claim 1, wherein the transport line is provided with a curved transport section which is curved with a predetermined radius, and the engager is provided rotatably along with the curved transport portion radially inwardly of the curved transport portion.

3. The transport apparatus according to claim 2, wherein the engaging device has a ring-shaped annular pedestal portion,
   the engager is provided with capable of sliding along the diametrical direction of the annular pedestal portion on the annular pedestal portion.

4. The transport apparatus according to claim 2, wherein the engaging device has a ring-shaped annular pedestal portion,
   the engager is provided with capable of sliding along the diametrical direction of the annular pedestal portion on the annular pedestal portion.

5. The transport apparatus according to claim 3, wherein a plurality of guide rail members are provided in the annular pedestal portion radially at predetermined intervals and slide members are provided with capable of sliding on the guide rail members, and
   the engager is fixed on the slide members.

6. The transport apparatus according to claim 4, wherein a plurality of guide rail members are provided in the annular pedestal portion radially at predetermined intervals and slide members are provided with capable of sliding on the guide rail members, and
   the engager is fixed on the slide members.

7. The transport apparatus according to claim 3, wherein the engager is urged toward the center of the annular pedestal portion by a spring member.

8. The transport apparatus according to claim 4, wherein the engager is urged toward the center of the annular pedestal portion by a spring member.

9. The transport apparatus according to claim 5, wherein the engager is urged toward the center of the annular pedestal portion by a spring member.

10. The transport apparatus according to claim 6, wherein the engager is urged toward the center of the annular pedestal portion by a spring member.

* * * * *